United States Patent Office 3,389,948
Patented June 25, 1968

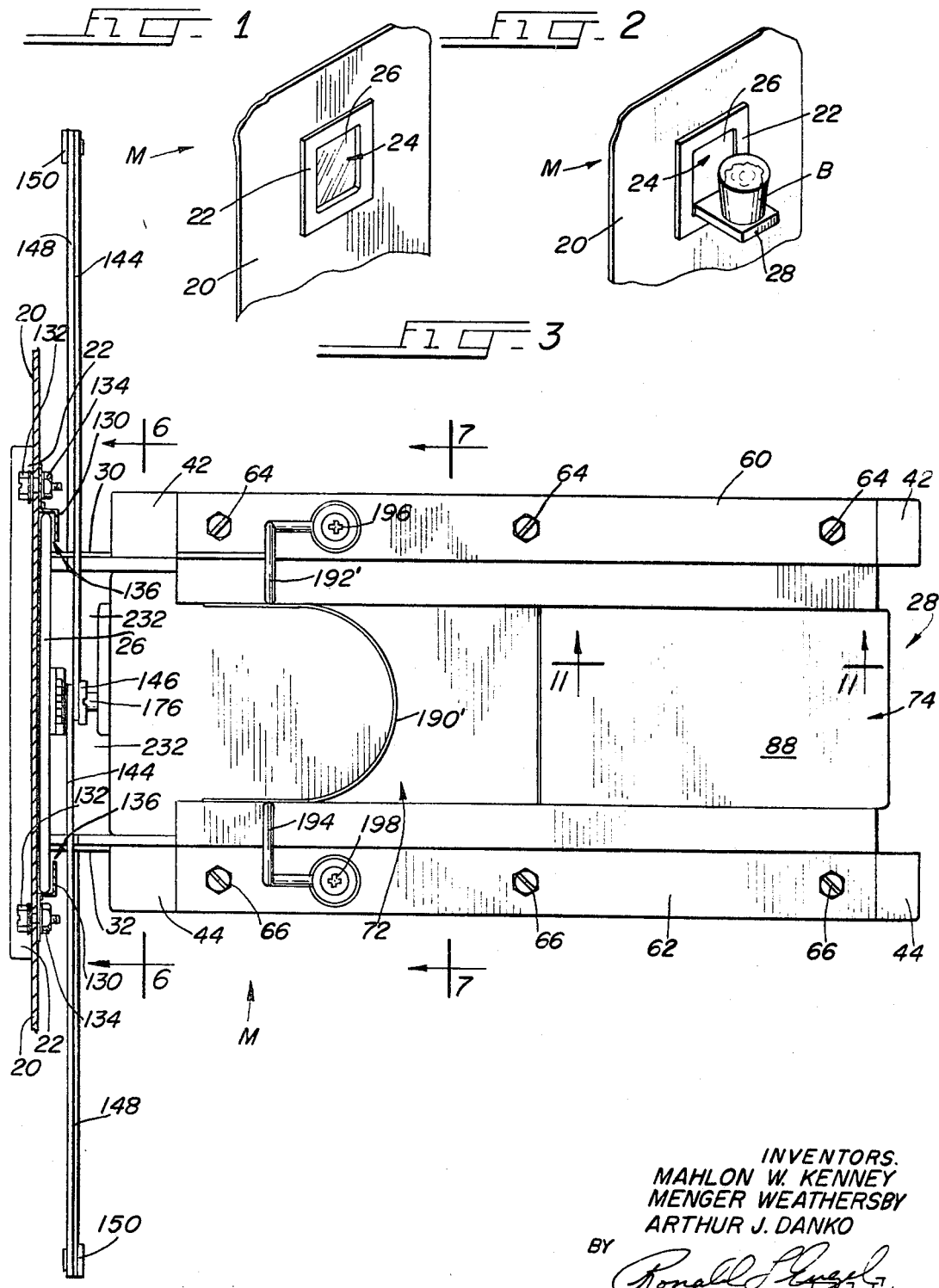

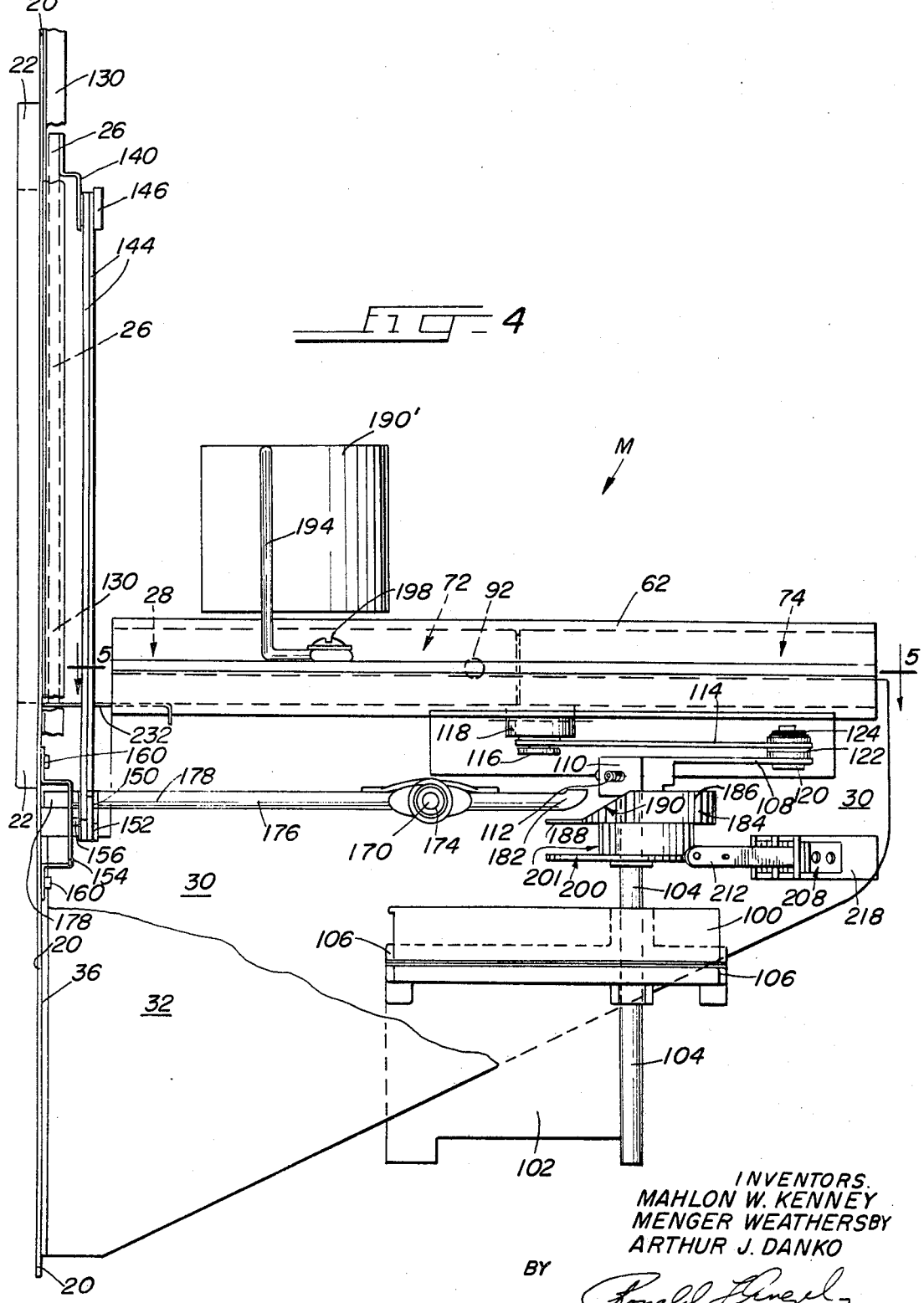

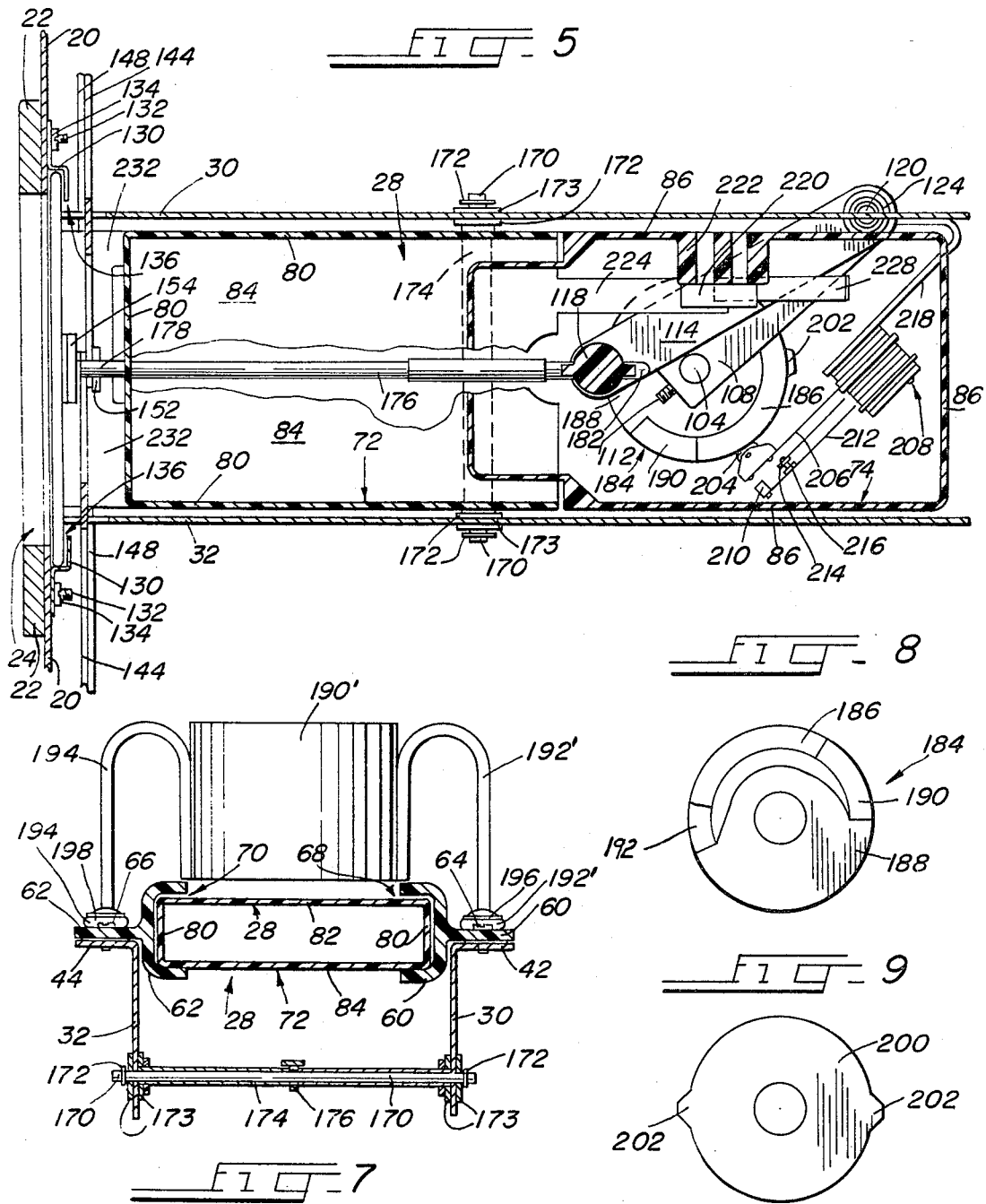

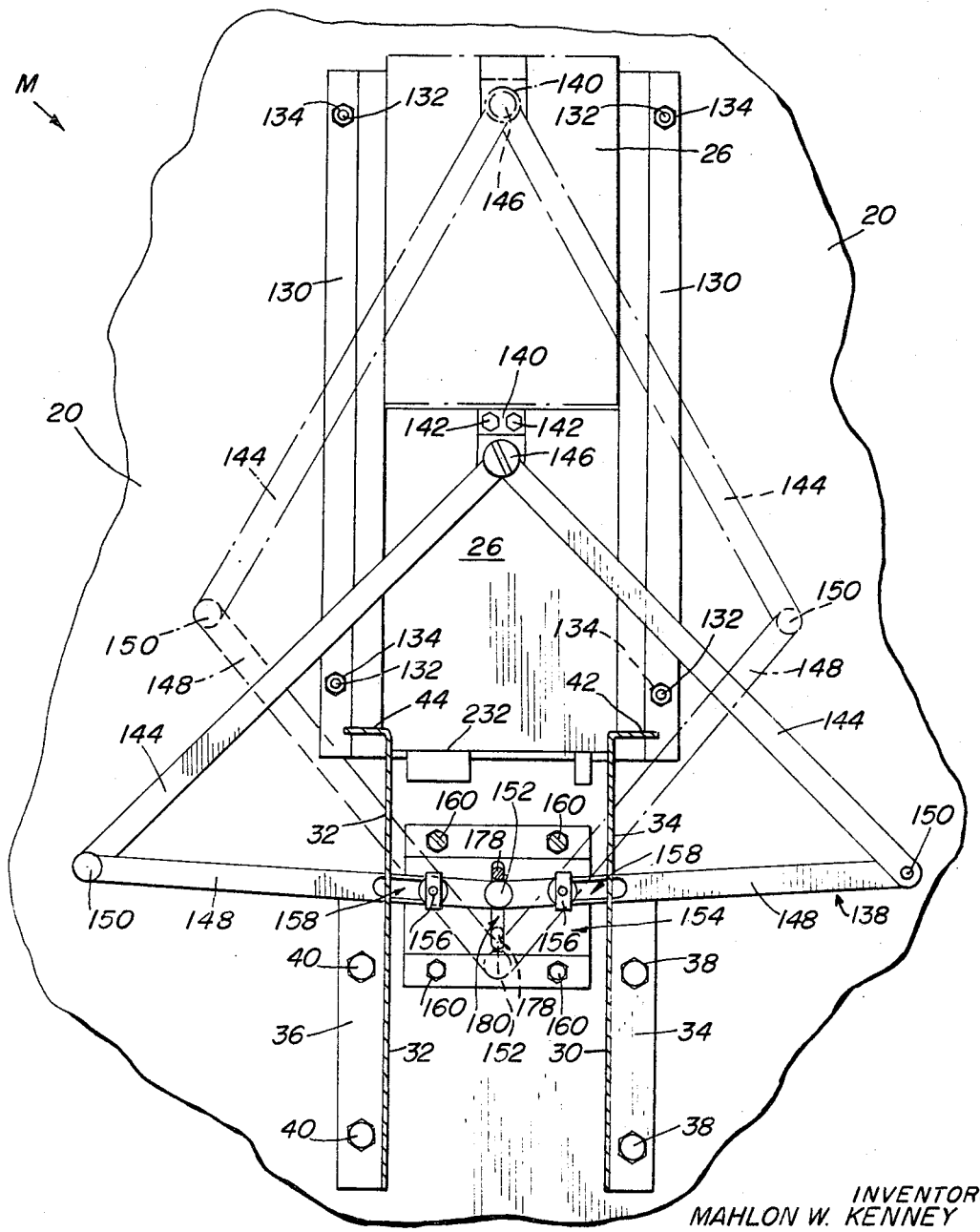

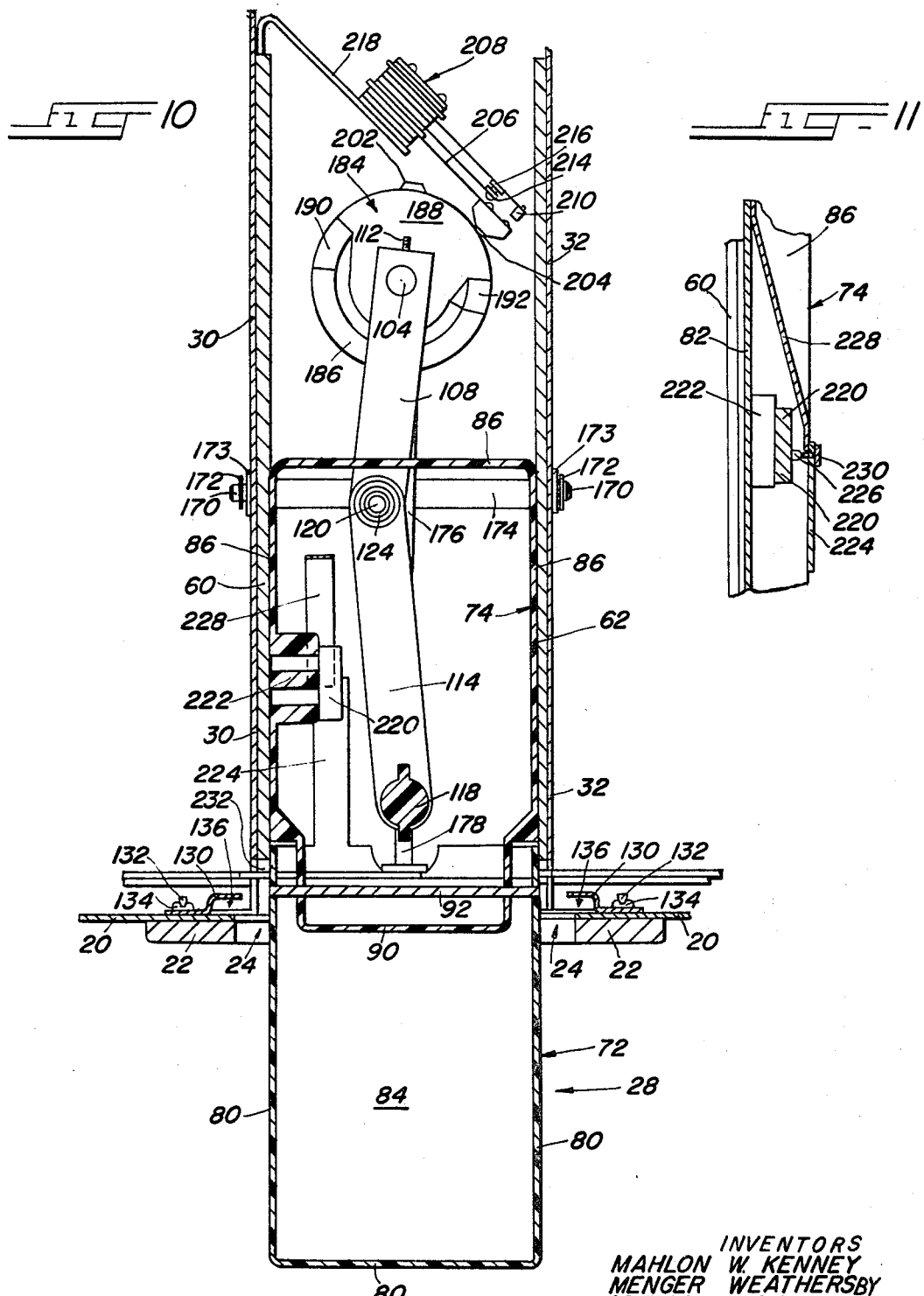

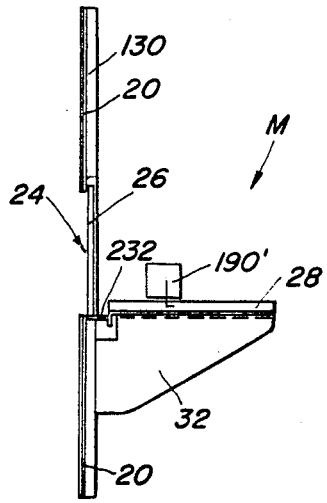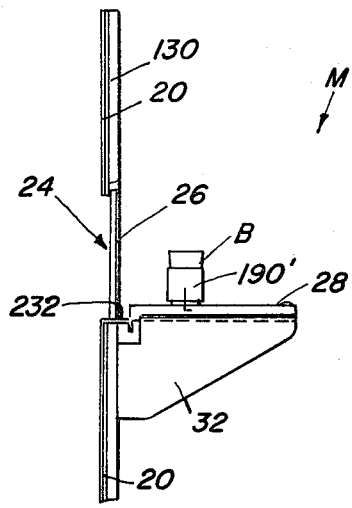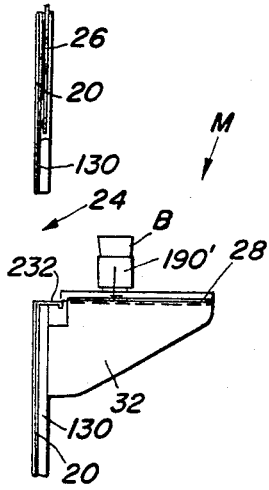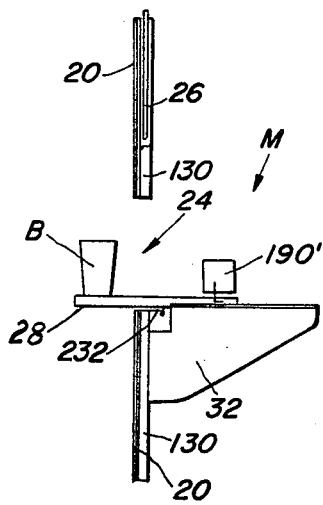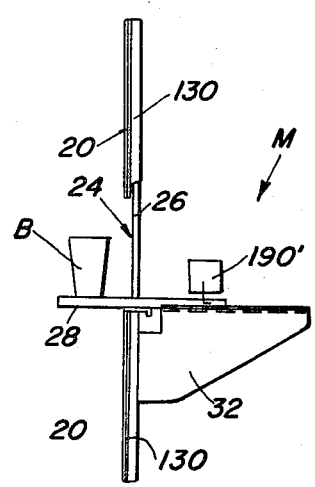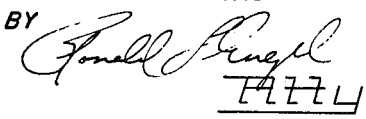

3,389,948
AUTOMATIC DELIVERY MECHANISM
Mahlon W. Kenney, Oak Park, Menger Weathersby, Chicago, and Arthur J. Danko, Oak Lawn, Ill., assignors to The Seeburg Corporation, Chicago, Ill., a corporation of Delaware
Filed Sept. 27, 1965, Ser. No. 490,475
14 Claims. (Cl. 312—310)

ABSTRACT OF THE DISCLOSURE

This application describes an automatic delivery mechanism for use in a vending machine including a transport slide which moves a merchandise article through an aperture from a position inside the machine to a position accessible to a purchaser. A cover normally extends across the aperture which is raised in front of and lowered behind the merchandise article as it is moved through the aperture by the transport slide. The cover is moved by a plurality of pivotally connected links, and the transport slide is moved by another plurality of links. The sequence of operation of the transport slide and cover is controlled by a cam and switch arrangement and an energy source which is adapted to move the cam.

---

This invention generally relates to automatic vending installations and more particularly to a unique device adapted to automatically deliver vended merchandise to a purchaser for manual pickup.

Conventional vending machines that vend freshly formulated beverages by the cup typically embody a vend stage area wherein the metered amounts of ingredients (e.g., flavoring syrup and carbonated water) are directed into a beverage cup. After the beverage is formulated in this manner, the customer then manually removes the cup from the vend stage area. Typically, for reasons of sanitation, a normally closed door is utilized to separate the vend stage area from the customer so that, in order to remove the cup of beverage, the customer must first open the door and then reach into the vend stage area in order to grasp the cup of beverage. The devices of the prior art have thus involved considerable inconvenience since a customer must use both hands to remove the cup of beverage from the vend stage area, one hand being used to hold the door open and the other hand being used to reach into the vend stage area and grasp the cup of beverage. The inconvenience is even more acute when a customer happens to be carrying something in one of his hands, since it is almost impossible to effect removal of a cup of beverage using only one hand.

In addition to the inconvenience associated with the beverage vending machines of the prior art, the operation of such devices also involves delays, since during the time the customer is reaching into the vend stage area in order to grasp and remove the cup of beverage, another purchase cannot be made, either by the same or by another customer. A further disadvantage of existing devices is that the level of sanitation sought to be obtained through the use of the door which encloses the vend stage area is impossible to obtain in actual practice, since customers must reach into the vend stage area with their hands in order to manually pick up a cup of beverage and moreover since customers and even proprietors of the vending machines often attempt to "jam" such a door in its opened position so as to avoid the inconvenience associated with manually opening the door pursuant to each purchase.

In accordance with the present invention, these and other disadvantages of the prior art devices are overcome.

Briefly described, the present invention comprises an automatic delivery mechanism adapted for incorporation in a vending installation, and includes means defining an aperture in the vending installation; cover means reciprocally movable between a first position wherein the aperture is covered and a second position wherein the aperture is uncovered; transport means reciprocally movable between a retracted position wherein said transport means is disposed within the vending installation and an extended position wherein said transport means extends externally of the vending installation through the aperture therein; and control means adapted to move the cover means and the transport means according to a predetermined sequence whereby an article situated on the transport means within the vending installation is conveyed to a point outside thereof by the transport means.

Preferably, the cycle of operation is arranged so that the cover means reciprocally moves between its first and second positions so as to cover and uncover the aperture once during the interval in which the transport means is moving from its retracted to its extended position. Moreover, in the preferred practice of the subject invention, means responsive to the presence of an article situated on the transport means in its extended position are provided for maintaining said transport means in said extended position.

A primary object of the present invention is to provide an automatic delivery mechanism adapted to deliver a vendible article to a customer at a point external of the vend stage area of the installation.

Another object of the present invention is to provide a mechanism adapted to automatically transport a vendible article from a normally closed vend stage area inside the vending installation to a delivery area outside the installation, the vend stage area being opened only for the relatively short time interval during which the vendible article is moved from the interior of the installation to the delivery area.

Yet another object of the present invention is to provide a mechanism of the character described capable of operation in accordance with desirable standards of sanitation and health.

A further object is to provide a mechanism of the character described which, in operation, provides faster, more convenient customer pick-up of the vendible article.

A still further object is to provide a mechanism capable of minimizing the time required for article delivery in an article vendor such that the vendor functions with great efficiency.

These and other objects, advantages, and features of the present invention will hereinafter appear, and, for purposes of illustration, but not of limitation, an exemplary embodiment of the present invention is shown in the accompanying drawings, in which:

FIGURE 1 is a fragmentary perspective view of the front of a vending installation embodying a delivery mechanism produced in accordance with the present invention, the mechanism being shown in its rest position;

FIGURE 2 is a view similar to FIGURE 1 showing the mechanism in an operative position;

FIGURE 3 is a top plan view of a preferred embodiment of the present invention;

FIGURE 4 is a right-side elevational view thereof with parts broken away for clarity of illustration;

FIGURE 5 is a sectional view taken substantially along line 5—5 in FIGURE 4;

FIGURE 6 is a fragmentary sectional view taken substantially along line 6—6 in FIGURE 3;

FIGURE 7 is a sectional view taken substantially along line 7—7 in FIGURE 3;

FIGURE 8 is a top plan view of a rise cam utilized in the preferred embodiment;

FIGURE 9 is a similar top plan view of a cycle cam;

FIGURE 10 is a sectional view substantially similar to FIGURE 5, but showing a transport slide in its extended position;

FIGURE 11 is a sectional view taken substantially along line 11—11 of FIGURE 3; and FIGURES 12–16 are partially schematic right-side elevational views of the present invention showing the sequence of operation thereof.

With reference to the drawings, FIGURES 1 and 2 generally illustrate an automatic delivery mechanism M embodying a front wall 20 (corresponding to the front wall of a vending installation) provided with an aperture frame 22 which defines an aperture 24 therein. Aperture 24 is normally covered by a vertically slideable door 26 (described in greater detail hereinafter). Operation of the device of the present invention results in the movement of a beverage cup B outwardly through the aperture 24 to a point outside the machine (see FIGURE 2). Movement of the cup B is accomplished by means of a movable transport slide 28, the structure and operation of which will be described in greater detail hereinafter. A customer merely grasps the beverage cup B and removes it from the slide 28 when it is positioned as shown in FIGURE 2, and it is unnecessary for the customer to manually raise the door 26 and reach inwardly through aperture 24 in order to pick up the cup B.

The overall structure of the mechanism M will now be described in detail. As shown in FIGURES 3, 4 and 6, a pair of side plates 30, 32 are respectively provided with outwardly turned flange portions 34, 36. Flanges 34, 36 are attached to the front wall 20 by suitable means such as bolts 38, 40. Portions of side plate 32 are broken away in FIGURE 4 in order to reveal the internal parts of the mechanism M. An outwardly turned horizontal flange 42 is formed along the upper edge of side plate 30, and a similar outwardly turned horizontal flange 44 is formed along the upper edge of side plate 32 (see especially FIGURES 3 and 6).

A pair of slide guides 60, 62 are respectively mounted on flanges 42, 44 by means of a plurality of bolts 64, 66 (see FIGURES 3 and 7). As best shown in FIGURE 7, slide guides 60, 62 respectively define a pair of slots 68, 70 into which the lateral edges of slide 28 fit. Thus, as slide 28 moves from its retracted position to its extended position (as hereinafter described), slide 28 moves within slots 68, 70 in guides 60, 62.

As best shown in FIGURES 5 and 10, transport slide 28 comprises a forward member 72 and a rearward member 74. The forward member 72 includes a generally U-shaped side wall 80 and, preferably integrally formed therewith, a top plate 82 and a bottom plate 84. Thus, forward member 72 is hollow and has an open rearward end. The rearward member 74 comprises a generally U-shaped side wall 86 and, preferably formed integrally therewith, a top plate 88. However, no bottom plate is formed beneath U-shaped side wall 86 so that rearward member 74 is open-bottomed.

A forwardly projecting bracket 90 is preferably formed integrally with U-shaped member 86, and bracket 90 is positioned in the hollow interior of member 72 (see FIGURES 5 and 10) so that forward member 72 is pivotable with respect to the rearward member 74. However, since the height of bracket 90 is only slightly less than the height of the opening between top plate 82 and bottom plate 84, the pivotal movement of member 72 with respect to member 74 is limited. The purpose for providing a two-piece transport slide 28, having a forward portion that is pivotable in a vertical direction with reference to the rearward portion thereof, will hereinafter be explained in detail.

Operating means are provided for reciprocating transport slide 28 from its retracted position (shown in FIGURES 3–5) and its extended position (shown in FIGURE 10). A motor mounting plate 100 is mounted between side plates 30, 32 and a motor 102 is attached to plate 100 by conventional means (not shown). Rotational motion is transmitted from motor 102 to a drive shaft 104 by means of a conventional gear box 106. Motor 102 and gear box 106 are conventional elements and are illustrated schematically in the drawings for purposes of brevity.

A driving link 108 is provided with a hub 110 (see especialy FIGURE 4) and hub 110 is adapted to fit over drive shaft 104 and to be fixed thereto by means such as a set screw 112. Thus, rotaion of shaft 104 causes drive link 108 to undergo pivotal movement about shaft 104. A slide link 114 is pivotally mounted to slide 28 by means of a pivot pin 116 which passes through slide link 114 and is fixed in a protuberance 118 which extends downwardly from top plate 88 of rearward member 74. Slide link 114 is pivotally mounted at its other end to drive link 108 by means of a pivot pin 120, spacing washers 122, and retaining members 124 (see FIGURE 4).

Rotation of shaft 104 (in response to the energization of motor 102) causes transport slide 28 to move between its extended and retracted positions by means of links 108, 114, which function as a conventional eccentric driving arrangement. An opening 126 is provided in side plate 30, and a similar opening (not shown) is provided in plate 32, so that the pivoted connection of links 108, 114 may pass therethrough as shown in FIGURE 5. Thus, the operation of the eccentric driving arrangement is not impeded by the plates 30, 32.

Means are provided for raising and lowering door 26 in order to permit transport slide 28 to move outwardly to its extended position as shown in FIGURES 2 and 10. A pair of angle brackets 130 are mounted on the inner side of front wall 20 by suitable means such as bolts 132 and nuts 134. Angle brackets 130 in combination with front wall 20 define a pair of vertical slots 136 (see especially FIGURE 10). The sides of door 26 are slideably received in slot 136 (see FIGURES 3 and 5) so that as door 26 moves from its lowered position, wherein it covers aperture 24, to its raised position, wherein aperture 24 is open, door 26 moves and is guided by slots 136.

Operating means for driving door 26 from its lowered to its raised position are provided in the form of a unit 138 (see FIGURE 6) comprising a plurality of links hereinafter described. A bracket 140 is fixed to door 26 adjacent its upper edge by suitable means such as bolts 142. A pair of upper door lift links 144 are pivotally attached to bracket 140 by means of a pivot bolt 146 (see FIGURE 6), and a pair of lower door lift links 148 are respectively pivoted to a corresponding upper link 144 by means of pivot pins 150. The other ends of lower links 148 are pivotally attached by means of a pivot pin 152. In addition, each of the lower door lift links 148 is, adjacent its lower end, pivoted to a bracket 154 (see FIGURES 4 and 6) by means of a pivot bolt 156 which passes through a slot 158 in link 148. Bracket 154 is attached to the inner side of front wall 20 by suitable means such as bolts 160 (see FIGURE 6).

The structure formed by the door lift links 144, 148 functions to move door 26 between its lowered and raised positions in the following manner. Links 144, 148 are movable between lowered positions (shown in full lines in FIGURE 6), wherein door 26 is disposed in its lowered position, and raised positions (shown in broken lines in FIGURE 6), wherein door 26 is disposed in its raised position. As a result of links 144, 148 moving from their lowered to their raised positions (i.e., from full to broken line positions in FIGURE 6), door 26 is raised. The movement of links 144, 148 from their lowered to their raised positions may conveniently be accomplished by exerting a downwardly directed force on the pivotal connection between links 148, i.e., by pushing downwardly on pivot pin 152. With links 144, 148 disposed in their FIGURE 6 full-line dispositions, if a downward force is applied to pivot pin 152, door 26 moves to its raised position. Thus, a multiplication effect is obtained, that is, movement of pin 152 a relatively short distance is translated into movement of door 26 through a relatively large distance.

Means are provided in order to apply a downwardly directed force to pivot pin 152 at predetermined points during the operational cycle of the mechanism M. A horizontally extending shaft 170 extends between side plate 30 and side plate 32 and is held in position by means of retaining washers 172 and spacing washers 173 (see FIGURES 4, 5, 7, and 10). A sleeve 174 is mounted on shaft 170 between plates 30, 32 (see especially FIGURE 7) and door lift rod 176 is pivotally mounted to sleeve 174 (see especially FIGURES 4 and 5). Rod 176 has an elongated forward end 178 which is positioned just above pivot pin 152 (see FIGURES 4 and 6) and passes through a vertical slot 180 in bracket 154 (see FIGURE 6). Thus, vertical movement of forward end 178 is limited by the upper and lower extremities of slot 180. As forward end 178 moves vertically in slot 180, pivot pin 152 vertically reciprocates also, resulting in the opening and closing of door 26 in the previously described manner. Thus, the pivotal movement of door lift rod 176 causes door 26 to open and close.

In order to control the pivotal movement of rod 176, a cam follower 182 is provided at the rearward end of rod 176 (see especially FIGURES 4 and 5). Cam follower 182 is adapted to contact the profile of a rise cam 184 which is mounted on drive shaft 104 for rotation therewith by suitable means (not shown). As shown in FIGURE 8, rise cam 184 has a raised or lobe portion 186 and a generally flat or dwell portion 188, portions 186, 188 being interconnected by a pair of inclined portions 190, 192 (see FIGURES 4 and 8). When rise cam 184 is rotated by shaft 104, door lift rod 176 pivots about shaft 170 as cam follower 182 cams against the profile of cam 184. Thus, when follower 182 engages inclined portion 190, rod 176 pivots in a counterclockwise direction (as shown in FIGURE 4) and forward portion 178 urges pivot pin 152 downwardly, resulting in door 26 moving to its raised position. So long as lobe portion 186 of rise cam 184 engages cam follower 182, door 26 remains in its opened position. However, when the inclined portion 192 of rise cam 184 is reached, door 26 moves toward its lowered position under the influence of gravity, causing pivot pin 152 to move to its FIGURE 6 full line position. In turn, pin 152 acts against rod end 178 and rod 176 pivots in a clockwise direction whereby follower 182 is maintained in engagement with rise cam 184. Thus, the rotation of drive shaft 104, in addition to effecting a reciprocating movement of transport slide 28 between its retracted and extended positions (via the eccentric drive arrangement of links 108, 114), also controls the opening and closing of door 26.

The profile of rise cam 184 is configured such that door 26 is maintained in its raised position (wherein the aperture 24 is uncovered) during a minimum amount of time during the cycle of operation of the mechanism M. Thus, when motor 102 is energized, and shaft 104 begins to rotate, door 26 is rapidly opened, and the eccentric driving arrangement is thereafter adapted to move transport slide 28 to its extended position (see FIGURES 2 and 10). Rise cam 184 is then adapted to permit door 26 to move downwardly so as to re-close the vend stage area. Thus, as shown in FIGURE 2, although transport slide 28 is disposed in its extended position, door 26 has moved downwardly so as to cover aperture 24. However, since slide 28 extends through aperture 24, door 26 cannot completely return to its lowered position. Instead, door 26 merely moves downwardly until it engages slide 28.

Guide means are provided in order to positively position a beverage cup on the slide 28 prior to the dispensation of metered amounts of the beverage constituents. A generally U-shaped cup guide 190' is mounted on slide guides 60, 62 by means of a pair of mounting brackets 192', 194 (formed of a suitable material such as wire) and a pair of mounting bolts 196, 198. When a cup is dropped onto slide 28 from a conventional cup-release mechanism (not shown), the guide 190' functions to prevent the cup from overturning. Instead, the cup is correctly positioned at the appropriate point on slide 28 whereby the metered amounts of ingredients may be directed into the cup.

In addition to the previously described rise cam 184, a cycle control cam 200 is also mounted on drive shaft 104 for rotation therewith, and a spacing washer 201 is provided between cams 184, 200 (see FIGURE 4). A pair of lobes 202 (see FIGURE 9) are provided at 180-degree intervals on the periphery of cycle control cam 200, and a roller follower 204 (see FIGURES 4, 5, and 10) is adapted to ride against the periphery of cam 200. Roller follower 204 is mounted on a blade 206 of a cycle control switch 208, and when roller follower 204 engages one of the lobes 202, the roller follower is cammed outwardly so as to engage an abutment 210 on a blade 212 of switch 208 so that a pair of normally closed contacts 214, 216 of switch 208 are separated. Switch 208 is mounted on side plate 30 by means of a bracket 218. Since lobes 202 are positioned 180 degrees apart on cam 200, the rotation of cam 200 causes contacts 214, 216 to open every 180 degrees. Conventional circuitry elements (not shown) are provided in order that electrical power is supplied to motor 102 so long as contacts 214, 216 are closed.

As best shown in FIGURES 5, 10, and 11, a cup sensing switch 220 is mounted beneath a mounting extension 222 formed beneath top plate 88 of rearward member 74. A tongue 224 extends toward the rear from bottom plate 84 of forward member 72, and tongue 224 terminates beneath an actuator 226 of switch 220. A spring blade 228 is mounted beneath top plate 88 adjacent the rear edge thereof, and spring blade 228 extends forwardly and is in engaging relationship with tongue 224 as shown in FIGURE 11. A bolt 230 passes through tongue 224 and the upper end of bolt 230 is positioned adjacent actuator 226. Thus, when tongue 228 pivots upwardly, bolt 230 contacts actuator 226 and switch 220 is reversed. Since spring blade 228 is positioned above tongue 224, spring blade 228 normally urges tongue 224 downwardly toward a position wherein the actuator 226 is not contacted by bolt 230.

When transport slide 28 is positioned in its retracted position (see FIGURES 3, 4 and 5), the front edge thereof rests on a supporting bracket 232 (see especially FIGURES 3-5), which may conveniently be formed integrally with front wall 20. With the front edge of slide 28 resting on bracket 232, bolt 230 does not engage actuator 226. However, when slide 28 is disposed in its extended position (see FIGURE 10), the weight of the forward member 72 thereof causes member 72 to pivot downwardly about shaft 92. Bolt 230 is adjusted in height with respect to tongue 224 such that spring blade 228 maintains tongue 224 and bolt 230 away from actuator 226 so long as no weight is placed on member 72 when it is in its extended position. However, with a cup filled with beverage disposed on the forward member 72 when it is in its extended position, the additional weight due to the cup of beverage is such that spring blade 228 is unable to restrain bolt 30 from engaging actuator 226. Thus, the actuator 226 of cup sensing switch 220 is depressed so long as the cup of beverage is disposed on the member 72 when it is extended. However, when a customer manually removes the cup of beverage from forward member 72, spring blade 228 is adapted to cause tongue 224 and bolt 230 to move away from actuator 226 whereby it returns to its normal position. Switch 220 is normally closed and is opened only when actuator 226 is depressed. As will hereinafter be described in greater detail, conventional circuitry means (not shown)

are adapted to supply electrical energy to motor 102 when cup sensing switch 220 is closed.

The operation of the mechanism M may now be described. With the mechanism M arranged in its rest position (see FIGURE 12), when a customer deposits coins of a value corresponding to the beverage purchase price and selects an appropriate beverage flavor, a cup B is properly positioned on slide 28 by means of guide 190'. The position of the mechanism M with the cup B positioned on slide 28 is shown in FIGURE 13. With the cup B so positioned, the beverage (e.g., coffee) or the beverage constituents (e.g., flavoring syrup and carbonated or plain water) are directed into the cup and, after the cup B is filled, the control mechanism of the beverage vendor is adapted to momentarily supply motor 102 with electrical energy. This causes motor 102 to begin to rotate and, as lobe 202 moves away from roller follower 204, contacts 214, 216 close, thereby, serving to independently supply motor 102 with electrical energy.

Continued rotation of shaft 104 causes cam 184 to rotate so that cam follower 182 of rod 176 rides against inclined surface 190 and lobe portion 186 in order to pivot rod 176 in a counter-clockwise direction (as shown in FIGURE 4). The downward movement of forward end 178 of rod 176 pushes downwardly against pivot pin 152, and door lift links 144, 148 cooperate to cause door 26 to move to its raised position. The arrangement of the parts of mechanism M after the door 26 has been raised is shown in FIGURE 14.

Continued rotation of shaft 104, by means of eccentric driving links 108, 114, causes transport slide 28 to move forwardly to its extended position whereby the cup B moves away from guide 190' and to a point in front of front wall 20. This position is shown in FIGURE 15 of the drawing. After the cup passes through the aperture 24, raise cam 184 is configured to permit rod 176 to pivot back in a clockwise direction (in response to the gravitational forces which cause door 26 to move downwardly). Thus, as shown in FIGURE 16, with transport slide 28 in its extended position, door 26 has moved downwardly so as to cover aperture 24.

When cam 200 completes 180 degrees of rotation (i.e., when slide 28 has reached its extended position), the other lobe 202 of cam 200 urges roller follower 204 to a position wherein contacts 214, 216 are separated, whereby motor 102 is de-energized. Since the cup sensing switch 220 is opened (i.e., because the full beverage cup B is disposed on slide 28 in its extended position), the mechanism M remains in the position shown in FIGURE 16 until the customer manually removes the cup B from the slide 28. As this occurs, spring blade 228 is adapted to cause tongue 224 and bolt 230 to move away from actuator 226, whereby the cup sensing switch 220 returns to its normal closed disposition, thereby effecting a re-energization of motor 102.

The re-energized motor 102 causes shaft 104 to rotate and, via links 108, 114, transport slide 28 is returned to its retracted rest position. When transport slide 28 moves rearwardly through aperture 24 (so as to move out from under door 26), door 26, under the influence of gravity, moves downwardly from the position shown in FIGURE 16 to its rest position (see FIGURE 12). When the shaft has completed 360 degrees of rotation, lobe 202 again moves roller follower 204 and thereby causes contacts 214, 216 to separate. Thus motor 102 is de-energized and the various parts of the mechanism M are indexed in the rest position shown in FIGURE 12.

An added advantage of the mechanism M of the present invention is that while the device is disposed in the position shown in FIGURE 16 (i.e., a position wherein the slide 28 is extended and the cup of beverage B is positioned on the extended slide 28), the same or another customer may deposit money and make a selection from the vendor. A second cup will then drop onto the transport slide and be positioned by guide 190'. However, the second cup will fall to rest on the rearward member 74 of slide 28 (since the slide is disposed in the position shown in FIGURE 10). After the second cup is positioned, the beverage is dispensed into the cup B, and the cup of beverage B is maintained in this position so long as the first cup has not been lifted from the slide in front of the mechanism M. However, when the original cup is removed from the slide, cup sensing switch 220 closes, slide 28 moves to its rearward position (the guide 190' preventing the second cup from moving backward with the rearwardly moving slide 28). When the slide reaches its rearward position, the control mechanism of the vendor is adapted to re-energize motor 102 so that the second cup is moved forwardly through aperture 24 in the previously described manner so as to be available for manual pick-up by the second customer.

An especial advantage of the automatic delivery mechanism of the present invention is that the door 26 covering the vend stage area is open for a minimum amount of time (i.e., only long enough for the slide 28 with the cup B thereon to move through the aperture 24 to its extended position). Immediately thereafter, the door 26 moves downwardly to again close the aperture 24. Thus, the sanitary condition of the vendor is markedly improved, not only because it is unnecessary for a customer to reach into the vend stage area, but also because the vend stage area is normally separated from the outside air by the door 26.

In addition to the described advantages of health and sanitation, the device M of the present invention also improves the operation of the vendor in that it is much more convenient for a customer to pick up his cup of beverage from the extended slide than it is to have to manually open a door and reach into a vend stage area. This added customer convenience likewise results in greater vendor efficiency since the vending of the cup of beverage is accomplished much more rapidly than in ordinary vending installations, especially since automatic removal of a first cup from the vend stage area enables a second cup to be filled even before the customer actually removes the first filled cup.

While the automatic delivery device of the present invention has been described with reference to a vending installation adapted to vend beverages in cup-sized quantities, it should be understood that the arrangement of the present invention may also be employed in other vending installations (e.g., cigarette vendors, candy vendors and the like) or in other suitable environments. Thus, the term "article" when used in the claims should be understood to refer to any suitable vendible or dispensable product.

It should be further understood that various changes, modifications, and alterations may be effected in the details of construction and arrangements of parts described herein, without departing from the spirit and the scope of the subject invention, as defined in the appended claims.

What is claimed is:

1. An automatic delivery mechanism adapted for use in a vending installation comprising:
   means defining an aperture in the vending installation;
   cover means reciprocally movable between a first position wherein the aperture is covered and a second position wherein the aperture is uncovered;
   transport means reciprocally movable between a retracted position, wherein the transport means is disposed within the vending installation, and an extended position, wherein the transport means extends externally of the vending installation through the aperture therein; and
   control means including shaft means and a drive member connected to the shaft means, said control means being adapted to move the cover means and the transport means in accordance with a predetermined sequence whereby the cover means moves from its first to its second position when an article is disposed on the transport means in its retracted position; thereafter the transport means moves from its retracted to its extended position; thereafter the cover means moves from its second toward its first position in order to cover a portion of the aperture; thereafter the transport means returns to its retracted position from its extended position; and thereafter the cover means returns to its first position in order to cover the aperture.

2. An automatic delivery mechanism, as claimed in claim 1, and further comprising means adapted to maintain the transport means in its extended position so long as an article is situated thereon.

3. An automatic delivery mechanism adapted for use in a vending installation comprising:
 means defining an aperture in the vending installation;
 cover means reciprocally movable between a first position wherein the aperture is covered and a second position wherein the aperture is uncovered;
 first operating means adapted when actuated to move the cover means between its first and second positions;
 transport means reciprocally movable between a retracted position, wherein the transport means is disposed within the vending installation, and an extended position, wherein the transport means extends externally of the vending installation through the aperture therein;
 second operating means adapted when actuated to move the transport means between its retracted and extended positions; and
 control means including shaft means, a drive member and control surface means connected to the shaft means, said control means being adapted to actuate the first and second operating means according to a predetermined operating cycle, whereby: the cover means moves from its first to its second position when an article is disposed on the transport means in its retracted position; thereafter the transport means moves from its retracted to its extended position; thereafter the cover means moves from its second toward its first position in order to cover a portion of the aperture; thereafter the transport means returns to its retracted position from its extended position; and thereafter the cover means returns to its first position in order to cover the aperture.

4. An automatic delivery mechanism, as claimed in claim 3, and further comprising means adapted to maintain the transport means in its extended position so long as an article is situated thereon.

5. An automatic delivery mechanism, as claimed in claim 3, wherein the first operating means comprises:
 rod means movable between a first position and a second position in response to movement of the drive member; and
 expandable and contractable unit means movable between a first position and a second position,
 the cover means being operatively connected to the unit means whereby the cover means and unit means move together between their respective first and second positions, and
 the unit means operatively engaging the rod means whereby movement of the rod means from its first to its second position causes the unit means to move to its second position and whereby movement of the rod means from its second to its first position permits the unit means to move toward its first position.

6. An automatic delivery mechanism, as claimed in claim 3, wherein the second operating means comprises linkage means for translating movement of the drive member into reciprocal movement of the transport means between its retracted and extended positions.

7. An automatic delivery mechanism adapted for use in a vending installation comprising:
 a frame adapted for incorporation in a vending installation as a portion of an outer wall thereof;
 means defining an aperture in the frame;
 a door member slidably mounted on the frame for reciprocal movement between a first position wherein the aperture is covered by the door and a second position wherein the aperture is uncovered;
 first operating means adapted when actuated to move the door between its first and its second positions;
 a transport slide mounted on the frame for reciprocal movement between a retracted position, wherein the slide is disposed within the vending installation, and an extended position, wherein the slide extends externally of the vending installation through the aperture in the frame;
 second operating means adapted when actuated to move the slide between its retracted and extended positions; and
 control means including shaft means, a drive member connected to the shaft means, and control surface means driven by the shaft means, said control means adapted for actuating the first and second operating means according to a predetermined operating cycle, whereby: the door member moves from its first to its second position when a vendible article is deposited on the slide in its retracted position; thereafter the slide moves from its retracted to its extended position; thereafter the door moves from its second toward its first position in order to cover the open portion of the aperture; thereafter the slide returns to its retracted position from its extended position; and thereafter the door returns to its first position in order to completely cover the aperture.

8. An automatic delivery mechanism, as claimed in claim 7, wherein the door member and the slide are perpendicularly disposed such that the door member may reciprocate vertically toward and away from the horizontally reciprocable slide.

9. An automatic delivery mechanism, as claimed in claim 8, and further comprising means adapted to maintain the slide in its extended position so long as a vendible article is situated thereon.

10. An automatic delivery mechanism, as claimed in claim 7, wherein the control means comprises:
 drive shaft means rotatably journaled in the frame;
 driving means adapted to rotate the drive shaft; and
 first cam means actuated by rotation of the shaft to control the actuation of the first operating means.

11. An automatic delivery mechanism, as claimed in claim 10, wherein the first operating means comprises:
 a rod pivotally mounted on the frame for movement between a first position and a second position,
 the rod comprising a forward portion and a rearward cam follower portion, the cam follower portion operatively engaging the first cam means whereby rotation of the drive shaft causes the rod to move between its first and second positions; and
 a plurality of interconnected links forming an expandable and contractable unit, the said unit being mounted on the frame for movement between a first position and a second position,
 the door being operatively connected to the unit whereby the door and the unit move together between their respective first and second positions, and
 the unit operatively engaging the forward portion of the rod whereby movement of the rod from its first to its second position causes the unit to move to its second position and whereby movement of the rod from its second to its first position permits the unit to move toward its first position.

12. An automatic delivery mechanism, as claimed in claim 10, wherein the second operating means includes an eccentric driving linkage arrangement operatively connecting the slide and the drive shaft whereby rotational movement of the drive shaft is translated into reciprocal linear motion of the slide between its retracted and extended positions.

13. An automatic delivery mechanism, as claimed in claim 10, wherein the control means further comprises a sensing switch adapted to maintain the driving means in a de-activated condition whenever a vendible article is disposed on the slide in its extended position.

14. An automatic delivery mechanism, as claimed in claim 7, and further comprising guide means on the frame adapted to position vendible articles on the slide.

References Cited

UNITED STATES PATENTS

| 1,596,921 | 8/1926 | Childs | 312—271 |
| 2,696,417 | 12/1954 | Jouk | 312—223 |

BOBBY R. GAY, *Primary Examiner.*

JAMES L. KOHNEN, *Assistant Examiner.*